United States Patent
Bertacchi

[11] Patent Number: 5,978,681
[45] Date of Patent: Nov. 2, 1999

[54] METHOD AND APPARATUS FOR PROVIDING CALLING SERVICE FEATURES WITHIN INCOMPLETELY UPGRADED CELLULAR TELEPHONE NETWORKS

[75] Inventor: Luciano Bertacchi, Pierrefonds, Canada

[73] Assignee: Telefonaktiebolaget L M Ericsson, Stockholm, Sweden

[21] Appl. No.: 08/660,116

[22] Filed: Jun. 7, 1996

[51] Int. Cl.[6] .................................................. H04Q 7/20
[52] U.S. Cl. .......................... 455/445; 455/432; 455/414
[58] Field of Search .................................. 455/433, 410, 455/432, 414, 422, 445, 415, 416, 417

[56] References Cited

U.S. PATENT DOCUMENTS

| | | | |
|---|---|---|---|
| 5,208,847 | 5/1993 | Allen | 455/445 |
| 5,251,249 | 10/1993 | Allen et al. | 455/560 |
| 5,291,544 | 3/1994 | Hecker | 379/60 |
| 5,325,419 | 6/1994 | Connolly et al. | 379/60 |
| 5,329,578 | 7/1994 | Brennan et al. | 455/445 |
| 5,333,186 | 7/1994 | Gupta | 379/201 |
| 5,353,331 | 10/1994 | Emery et al. | 379/58 |
| 5,379,337 | 1/1995 | Castillo et al. | 379/45 |
| 5,511,111 | 4/1996 | Serbecioglu et al. | 455/414 |
| 5,564,068 | 10/1996 | Nguyen | 455/433 |
| 5,579,375 | 11/1996 | Ginter | 455/433 |
| 5,711,002 | 1/1998 | Foti | 455/433 |

FOREIGN PATENT DOCUMENTS

| | | |
|---|---|---|
| WO 93/21715 | 10/1993 | European Pat. Off. . |
| WO 94/10814 | 5/1994 | European Pat. Off. . |
| 0 715 473 A2 | 11/1994 | European Pat. Off. . |

OTHER PUBLICATIONS

PCT Standard Search Report, Jan. 20, 1998 for International Application No. PCT/SE97/00813.

*Primary Examiner*—Edward F. Urban
*Assistant Examiner*—Tilahun Gesesse
*Attorney, Agent, or Firm*—Jenkens & Gilchrist

[57] ABSTRACT

For a call received by an originating switching node in a cellular telephone network that does not support all upgraded calling service features, the call is redirected and transited for further handling to an upgraded service switching node. Alternatively, the call is redirected and transited only when the originating switching node has not been ungraded to support subscripted to calling service features or a certain initiated calling service feature. As another alternative, the call is handled by the originating switching node (i.e., through connected to a service switching node) up until such time as a calling service feature is initiated, and is then redirected and transited if the initiated calling service feature is not supported.

20 Claims, 5 Drawing Sheets

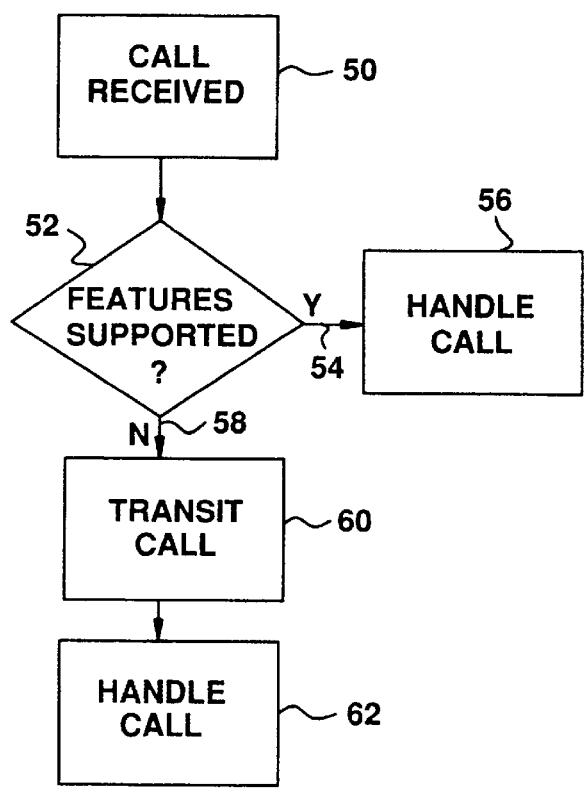
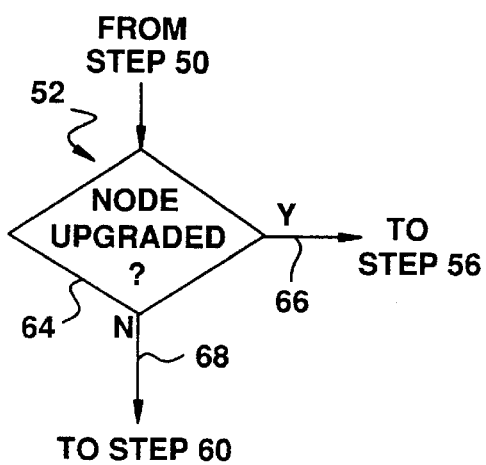
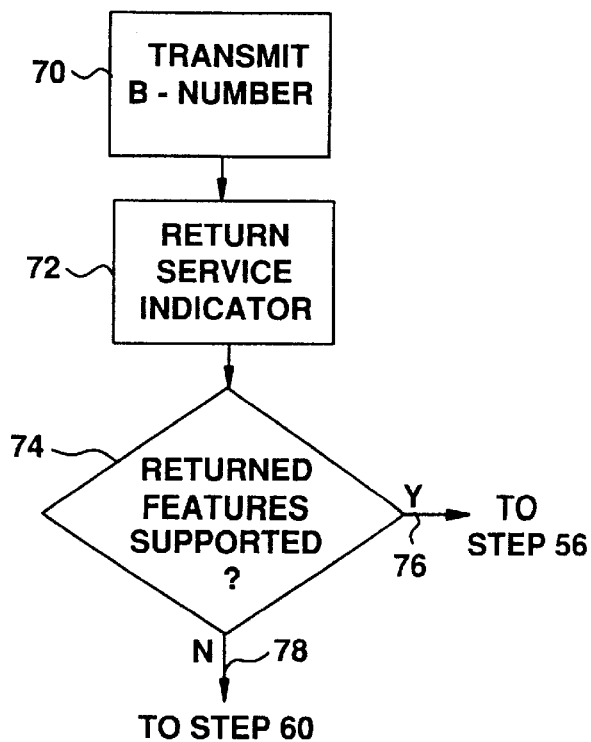
FIG.2A
FIG.2B
FIG.2C

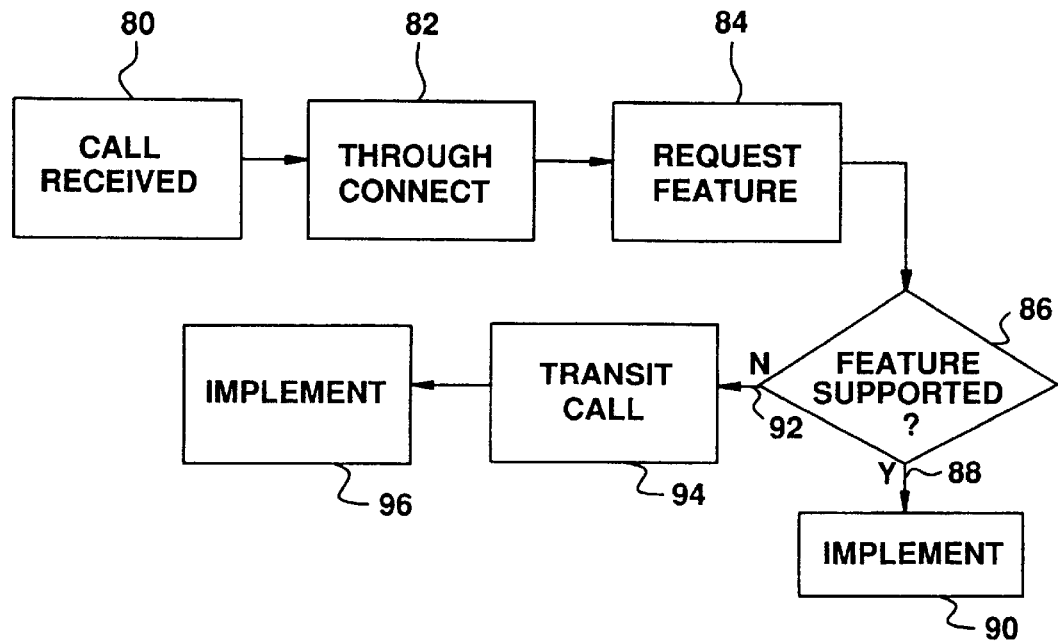
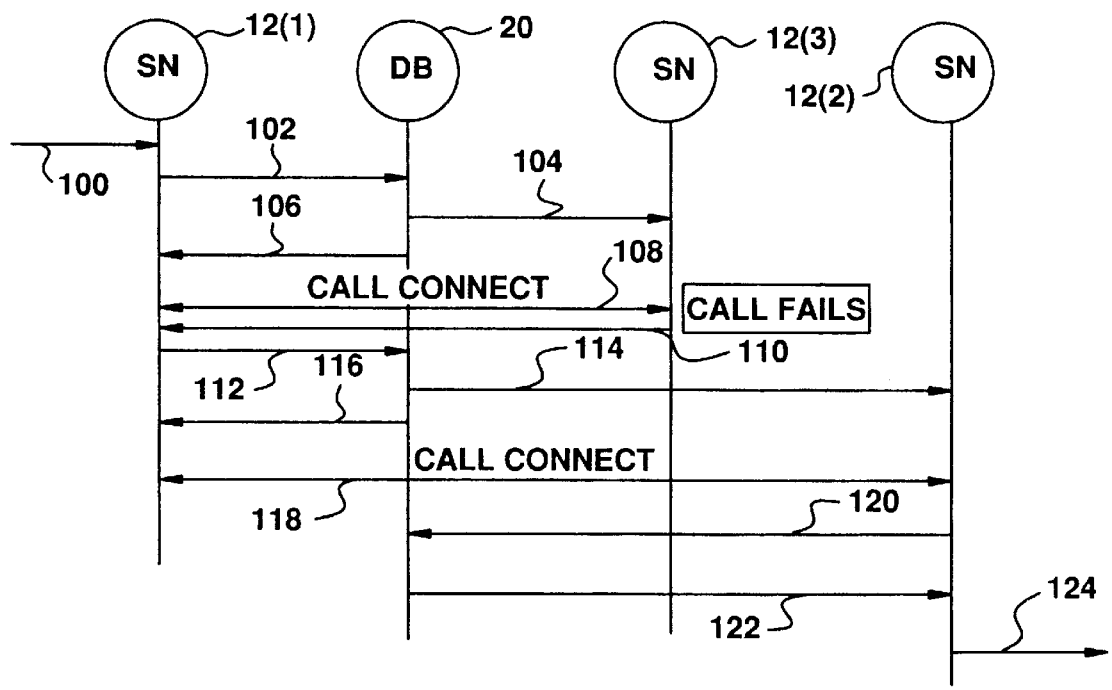

METHOD AND APPARATUS FOR PROVIDING CALLING SERVICE FEATURES WITHIN INCOMPLETELY UPGRADED CELLULAR TELEPHONE NETWORKS

BACKGROUND OF THE INVENTION

1. Technical Field of the Invention

The present invention relates to cellular telephone networks and, in particular, to the provision of a calling service feature to a subscriber in connection with a cellular telephone call originally made through a switching node of the network that has not yet been upgraded to provide support for that particular calling service feature.

2. Description of Related Art

New calling service features are constantly being developed and implemented by cellular telephone network service providers. These calling service features are typically provided by the switching nodes within the cellular telephone network, and thus in order to offer the calling service feature to all subscribers regardless of location within the network each of the switching nodes must be upgraded to support the feature. Because of the large number of switching nodes present in the cellular telephone network, it is not possible for each of the switching nodes to be substantially simultaneously upgraded to provide the new calling service feature. Furthermore, in some instances it may not make economic sense to upgrade the switching node in view of the low incidence of traffic patterns involving such new service features.

A call made through a switching node that has not yet been upgraded cannot initiate those new calling service features. It would be an advantage for that time period during which the upgrading of all switching nodes within the network has not been completed, if such new calling service features could be offered and provided to all subscribers regardless of either the mobile station location within the cellular telephone network or the upgrade status of the switching node that originally handles the call.

SUMMARY OF THE INVENTION

With respect to a call received by an originating switching node that does not support upgraded calling service features, the call is selectively transited for further handling to a service gateway switching node that is upgraded to support the calling service features. In one embodiment, a determination is made as to whether the originating switching node has been upgraded to handle the latest service provider made available calling service features. If not, the call is automatically transited to the selected gateway switching node. In another embodiment, the called number (B-number) for the call is analyzed to determine if the originating switching node supports all the calling service features to which the called party subscribes, or alternatively a specific calling service feature initiated by the call. If not, the call is automatically transited to the selected service gateway switching node.

In accordance with another implementation of the present invention, the call received by the originating switching node is handled (e.g., through connected to a serving node) by the originating node until such time as a calling service feature is initiated. At that point, a determination is made as to whether the originating switching node supports upgraded calling service features. If not, the call is selectively transited to a service gateway switching node that is upgraded to support the calling service features. The support determination may be made in accordance with whether the originating switching node has been upgraded to handle either the latest service provider made available calling service features, the calling service features subscripted to by the called party, or the specific initiation in the home location register of the calling service feature.

BRIEF DESCRIPTION OF THE DRAWINGS

A more complete understanding of the method and apparatus of the present invention may be acquired by reference to the following Detailed Description when taken in conjunction with the accompanying Drawings wherein:

FIGS. 2A through 2D are flow diagrams describing cellular telephone network handling of a call in connection with the initiation of a calling service feature in accordance with the present invention;

FIG. 4 is a signal flow and node operation diagram for the example call handled as illustrated in FIG. 3;

DETAILED DESCRIPTION OF THE DRAWINGS

Figure 1:
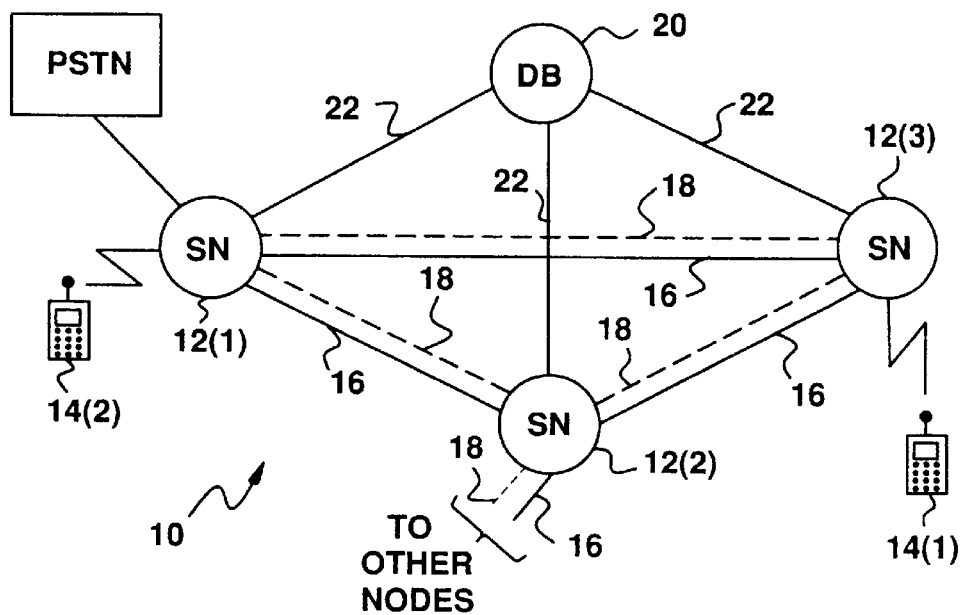
FIG. 1 is a schematic diagram of a cellular telephone network.

Reference is now made to FIG. 1 wherein there is shown a simplified schematic diagram of a cellular telephone network 10 including a plurality of interconnected switching nodes (SN) 12. Although only three switching nodes 12 are shown, it will be understood that the network 10 likely includes many more interconnected nodes. The switching nodes 12 may comprise any one of a number of known telecommunications switching devices, including those commonly used and known in the art for providing either digital or analog cellular telephone service to a plurality of mobile station subscribers 14. The switching nodes 12 are interconnected for communication via both signaling links 16 (illustrated with solid lines) and voice trunks 18 (illustrated with broken lines). The voice trunks 18 provide voice and data communications paths used to carry subscriber communications between the nodes 12. The signaling links 16 carry command signals between the nodes 12 used for setting up and tearing down voice and data communications links over the voice trunks 18, and for controlling the provision of special subscriber calling service features to the mobile station subscribers 14.

The switching nodes 12 are connected to a data base (DB) 20 (or perhaps to plural data bases if necessary) comprising, for example, a home location register (HLR) and/or visitor location register (VLR), by means of signaling links 22. The data base(s) 20 store information concerning the mobile station subscribers 14 comprising location information and service information. In particular, the data bases 20 store subscriber telephone numbers related to an identification of certain calling service features to which the mobile station subscribers associated with the telephone numbers are entitled to use. Such calling service features may include call waiting, three-way calling, paging, voice mail, call forwarding and multi-leg calling (flexible alerting or mobile access hunting). Other calling service features are known to those skilled in the art.

New calling service features are constantly being developed and implemented by cellular telephone network service providers. These calling service features are typically provided by the switching nodes 12 within the cellular telephone network 10. In order to make the calling service features available to all mobile station subscribers 14 throughout the cellular telephone network 10 regardless of either subscriber location or the originating point (node) for a call, each of the switching nodes 12 must be upgraded to support the service. Because of the large number of switching nodes 12 present in the cellular telephone network 10, however, it is not possible for each of the switching nodes to be substantially simultaneously upgraded to provide new calling service features. Accordingly, calls made through switching nodes 12 that have not yet been upgraded cannot take advantage of those new calling service features.

Reference is now additionally made to FIGS. 2A through 2D wherein there are shown flow diagrams describing cellular telephone network 10 handling of a call and the initiation of a calling service feature when the network has not yet been completely upgraded to provide such a calling service feature.

With specific reference now to FIG. 2A, in addition to FIG. 1, a call dialed to the number (B-number) of a called mobile station subscriber 14(1) is received by an originating switching node 12(1) in step 50. This call may originate with another subscriber (mobile station 14(2)) of the cellular telephone network 10, or be received from the public switched telephone network (PSTN). If the originating switching node 12(1) can support all of the calling service features to which the called mobile station subscriber 14(1) may be entitled to use, as determined in decision step 52 during location interrogation of the home location register (and branch 54), the completion of the call and the activation (implementation) of initiated calling service features are handled by the originating switching node in step 56 in a manner well known to those skilled in the art. If the originating switching node 12(1) cannot support all of the calling service features to which the called mobile station subscriber 14(1) is entitled to use (branch 58), as determined by the home location register, the call is selectively rerouted and transited in step 60 by the originating switching node to a designated (gateway) service switching node 12(2) which can support the calling service features. It should be noted that the home location register may preroute the call to the service switching node and return the resulting temporary location directory number (TLDN) to the originating node. The originating node then reroutes and transits the call to the service switching node using the temporary location directory number. If rerouted and transited, the designated service switching node 12(2) then handles the completion of the call and the execution (implementation) of calling service features in step 62 in a manner well known to those skilled in the art.

In one embodiment illustrated in FIG. 2B, the determination of decision step 52 and selective transiting of decision step 60 (FIG. 2A) may be made by identifying in decision step 64 whether the originating switching node 12(1) has been upgraded with the latest available cellular telephone network 10 calling service features. This determination is likely to be made by the home location register data base 20. If it has been upgraded (branch 66), the originating switching node 12(1) can support all of the calling service features to which the called mobile station subscriber 14(1) is entitled to use. Accordingly, the call received at the originating switching node 12(1) is handled by the originating switching node in step 56 of FIG. 2A. If not (branch 68), the call received at the originating switching node 12(1) is selectively transited by the originating switching node in step 60 and handled by the designated (gateway) service switching node 12(2) in step 62. It should be noted here that the home location register could return the originally dialed B-number preceded by a special prefix (the modified B-number). The originating switching node then uses the modified B-number to reroute and transit the call to the service switching node. The service switching node then interrogates the home location register to locate the called subscriber and preroute the call. One potential drawback with this embodiment is that if the originating node has not been upgraded, all calls therethrough are automatically transited. In order to avoid congestion problems at the service switching node 12(2), it is important that the switching node possess sufficient capacity for handling calls in view of the increased load generated from transited calls.

In another embodiment illustrated in FIG. 2C, the determination of decision step 52 and selective transiting of decision step 60 (FIG. 2A) may be made by the originating switching node 12(1) through analysis of a service indicator received from the home location register. The originating switching node 12(1) interrogates the home location register data base 20 in step 70 to locate the called mobile subscriber (B-number). Responsive thereto, the home location register data base 20 returns a service indicator to the originating switching node 12(1) in step 72 identifying the calling service features subscripted to by the called party. It is then determined in step 74 whether the originating switching node 12(1) can support each of the identified calling service features, and perhaps in particular a specific initiated one of those calling service features. If it can (branch 76), the call received at the originating switching node 12(1) is handled by the originating switching node in step 56 of FIG. 2A. If it cannot support the calling service features (branch 78), the call received at the originating switching node 12(1) is transited by the originating switching node in step 60 (with a special prefix followed by the received service switching node temporary location directory number) and handled by the designated (gateway) service switching node 12(2) in step 62. This alleviates some of the potential congestion problems experienced with the method of FIG. 2B in that only those calls to B-number parties subscripted to non-supported (and further, perhaps, actually initiated) calling service features are transited. All other calls are handled by the originating switching node 12(1).

Reference is now additionally made to FIG. 2D, along with FIG. 1, for an alternative method of cellular telephone network 10 handling of a call and the initiation of a calling service feature. A call dialed to the number (B-number) of a mobile station subscriber 14(1) is received by an originating switching node 12(1) in step 80. This call may originate with another subscriber of the cellular telephone network 10, or be received from the public switched telephone network (PSTN). The originating switching node 12(1) then through completes the call in step 82 to a serving switching node 12(3) for the called mobile station subscriber 14(1). The identification of the serving switching node 12(3) for the called mobile station subscriber 14(1) and the through completion of the call thereto is made in a manner well known in the art. After the call has been through connected, a calling service feature is initiated in step 84 (for example, by failure of the through connected call to be answered by the subscriber). The originating or serving switching node, depending on whether they are separated by a LATA border, interrogates the home location register to request the applicable service feature(s) for the call. At this point, the home location register determines in step 86 whether the interrogating (i.e., originating or serving switching node can support the upgraded calling service features and in particular the initiated calling service feature. If it can (branch 88), the initiated calling service feature is implemented by the interrogating switching node in step 90 in a manner well known to those skilled in the art. If the interrogating switching node 12(1) cannot support the upgraded calling service features (branch 92), the call is redirected and transited in step 94 by the interrogating switching node to a designated (gateway) service switching node 12(2) which can support the initiated calling service feature. The designated service switching node 12(2) then implements the initiated calling service feature in step 96 in a manner well known to those skilled in the art.

The determination of decision step 86 of FIG. 2D may be made in accordance with either of the embodiments illustrated in FIGS. 2A or 2C. Thus, decision step 86 may comprise the home location register determining whether the interrogating switching node has been upgraded with the latest available (or at least the current) cellular telephone network 10 calling service features, and if not the home location register preroutes the service call to the service switching node and returns the resulting temporary location directory number to the interrogating node. Alternatively, decision step 86 may comprise the interrogating switching node determining from the service indicator returned by the home location register whether the interrogating switching node can support upgraded calling service features and in particular the initiated calling service feature, and if not transiting the call along with a special service prefix followed by the received service switching node temporary location directory number.

Figure 3:
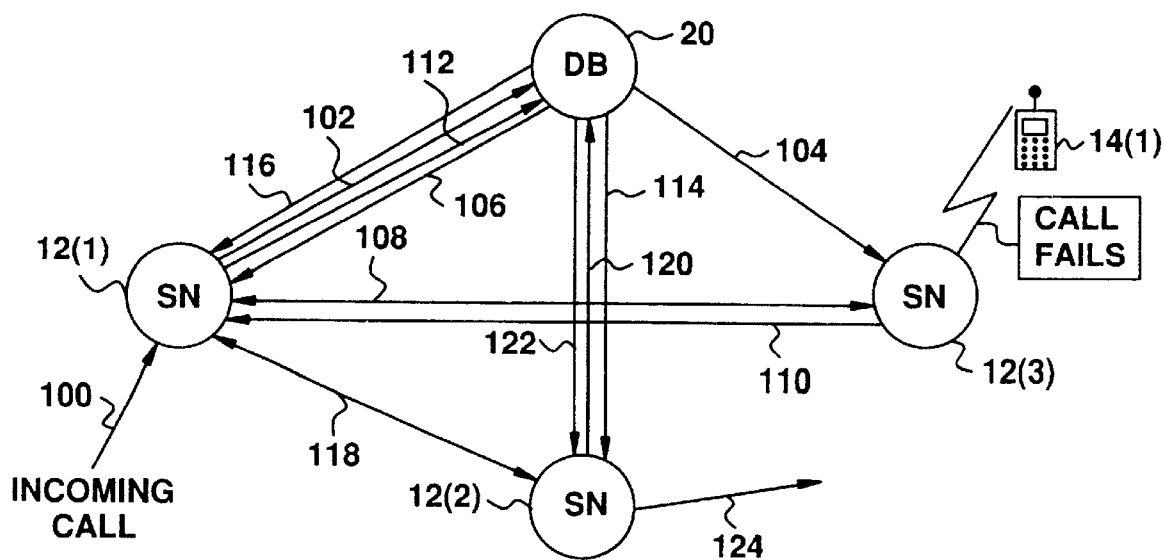
FIG. 3 is a schematic diagram of a cellular telephone network illustrating the flow of signals in connection with the handling of an example call and the initiation of a calling service feature.

Reference is now made in combination to FIGS. 1, 3 and 4. FIG. 3 is a schematic diagram of a cellular telephone network 10 illustrating the flow of signals in connection with a specific example of the handling of a call and the initiation of a calling service feature. FIG. 4 is a signal flow and node operation diagram for the example call handled as illustrated in FIG. 3.

A call 100 originates from another cellular subscriber or the PSTN and is received at the originating switching node 12(1). Using the signaling link 22, the originating switching node 12(1) interrogates 102 the home location register data base 20 to determine the location (i.e., serving switching node 12(3)) within the cellular network 10 of the called mobile station subscriber 14(1). Responsive to this interrogation, the data base 20 signals 104 the serving switching node 12(3) for the called mobile station subscriber 14(1) over signaling link 22 to pre-route the call, and then returns 106 a temporary location directory number (and associated parameters) for the called mobile station subscriber to the originating switching node 12(1). The call is then delivered (through connected) 108 over the voice trunk 18 to the serving switching node 12(3) for attempted completion to the called mobile station subscriber 14(1).

Assume now that the attempted call completion to the called mobile station subscriber 14(1) fails. This may occur, for example, due to a failure of the subscriber to answer, a busy condition for the called telephone 14 or a congestion condition on the trunks 18 connecting the switching node 12. At this point, the serving switching node 12(3) signals 110 the originating switching node 12(1) over signaling link 16 concerning the re-direction (i.e., aborting) of the call. In response to the call failure, a calling service feature is to be initiated by the originating switching node 12(1) for transferring the call. The originating switching node 12(1) then requests 112 over signaling link 22 a transfer-to number from the home location register data base 20. In this example, it is assumed that the originating switching node 12(1) has not been upgraded with respect to all calling service features (and in particular the transfer calling service feature to be initiated in response to the call failure). The data base 20 then recognizes that the originating switching node cannot support the desired transfer calling service feature. Accordingly, the data base 20 signals 114 a (gateway) service switching node 12(2) over signaling link 22 to pre-route the call, and then returns 116 a temporary location directory number (and associated parameters such as a service indicator) for the service switching node to the originating switching node 12(1). The call is then delivered 118 over the voice trunk 18 to the service switching node 12(2). The service switching node 12(2) then requests 120 the call transfer calling service feature from the home location register data base 20 over signaling link 22. The data base 20 replies 122 to the service switching node 12(2) with transfer service calling numbers and associated information (comprising perhaps multi-leg calling information), and the call is handled 124 in accordance with the initiated calling service feature. The steps 120 and 122 may advantageously be skipped if the data base signal 114 sent to the (gateway) service switching node 12(2) includes the call transfer calling service feature information (transfer service calling numbers and associated information).

Figure 5:
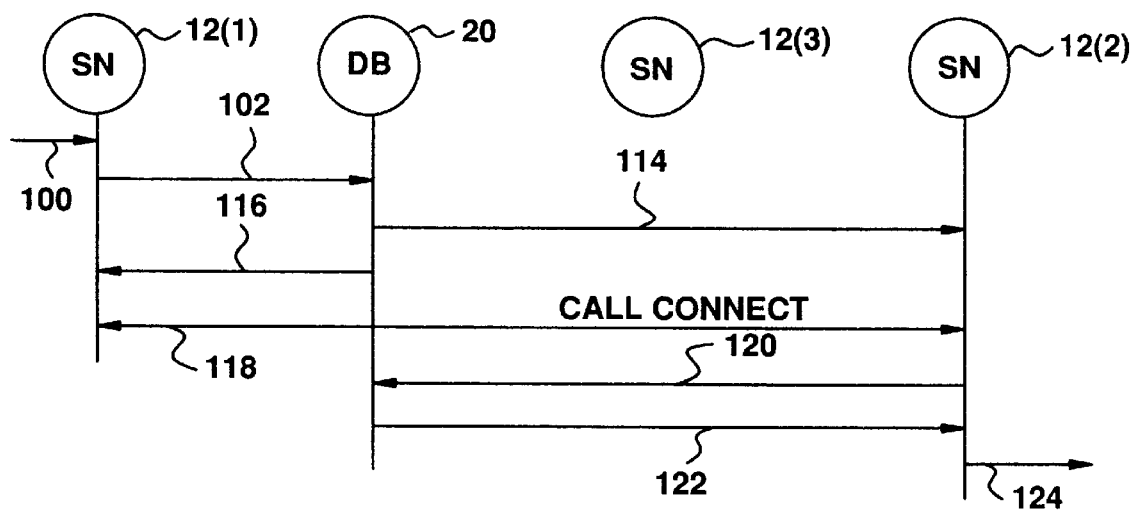
FIG. 5 is a signal flow and node operation diagram for another example call.

Reference is now made in combination to FIGS. 1 and 5. FIG. 5 is a signal flow and node operation diagram for another call handling example (which comprises a modification of that illustrated in FIGS. 3 and 4). A call 100 originates from another cellular subscriber or the PSTN and is received at the originating switching node 12(1). Using the signaling link 22, the originating switching node 12 (1) interrogates 102 the home location register data base 20 to determine the location (i.e., serving switching node 12(3)) within the cellular network 10 of the called mobile station subscriber 14(1). Responsive to this interrogation, the data base 20 identifies that the originating switching node 12(1) is incapable of supporting service features for the call. Accordingly, the data base 20 signals 114 a (gateway) service switching node 12(2) over signaling link 22 to pre-route the call, and then returns 116 a temporary location directory number (and associated parameters such as a service indicator) for the service switching node to the originating switching node 12(1). The call is then delivered 118 over the voice trunk 18 to the service switching node 12(2). The service switching node 12(2) then requests 120 the calling service feature information from the home location register data base 20 over signaling link 22. The data base 20 replies 122 to the service switching node 12(2) with service feature information, and the call is handled 124 in accordance with any subsequently initiated calling service feature. The steps 120 and 122 may advantageously be skipped if the data base signal 114 sent to the (gateway) service switching node 12(2) includes the service feature information for the called mobile station.

Figure 6:
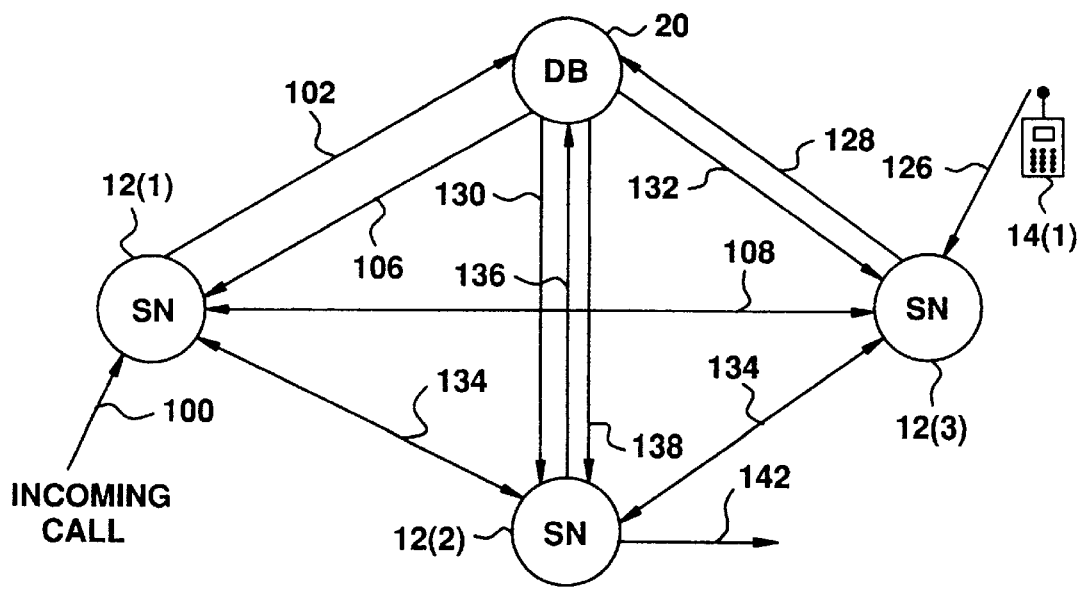
FIG. 6 is a schematic diagram of a cellular telephone network illustrating the flow of signals in connection with the handling of an example call and the initiation of a calling service feature at a serving (destination) node for the call.
Figure 7:
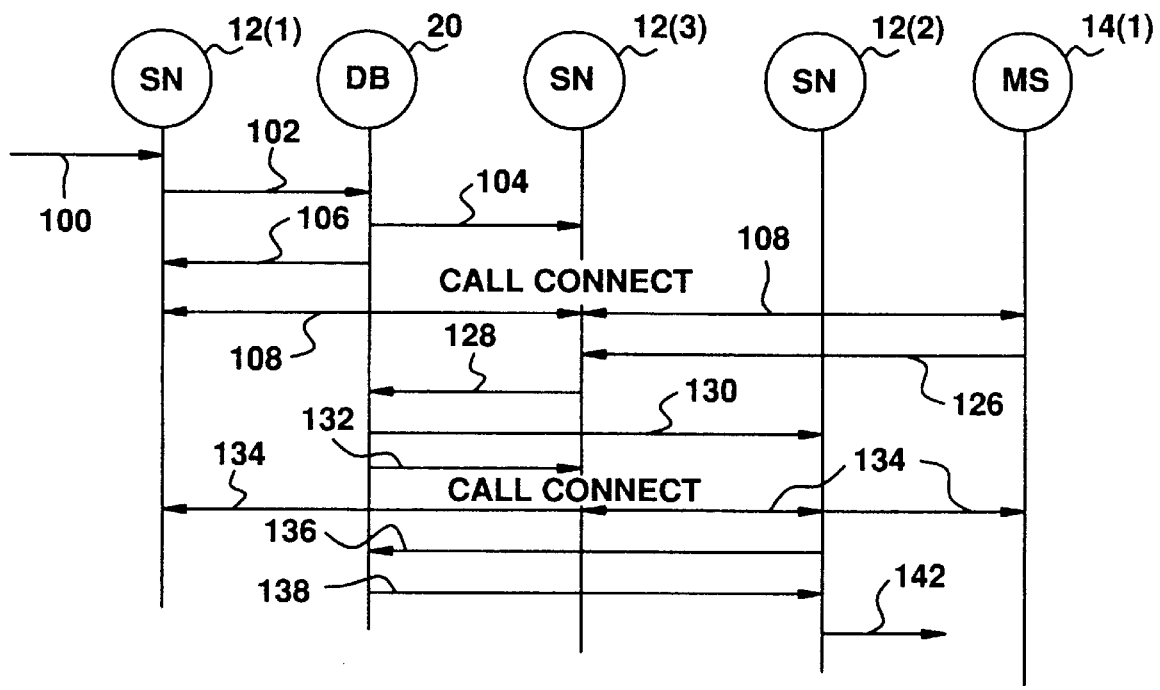
FIG. 7 is a signal flow and node operation diagram for the example call handled as illustrated in FIG. 6.

Reference is now made in combination to FIGS. 1, 6 and 7. FIG. 6 is a schematic diagram of a cellular telephone network 10 illustrating the flow of signals in connection with the handling of an example call and the initiation of a calling service feature at a serving (destination) switching node 12(3) for the call. FIG. 7 is a signal flow and node operation diagram for the example call handled as illustrated in FIG. 6.

A call 100 originates from another cellular subscriber or the PSTN and is received at the originating switching node 12(1). Using the signaling link 22, the originating switching node 12(1) interrogates 102 the home location register data base 20 to determine the location (i.e., serving switching node 12(3)) within the cellular network 10 of the called mobile station subscriber 14(1). Responsive to this interrogation, the data base 20 signals 104 the serving switching node 12(3) for the called mobile station subscriber 14(1) over signaling link 22 to pre-route the call, and then returns 106 a temporary location directory number (and associated parameters) for the called mobile station subscriber to the originating switching node 12(1). The call is then delivered (through connected) 108 over the voice trunk 18 to the serving switching node 12(3) for attempted completion to the called mobile station subscriber 14(1).

Assume now that the called mobile station desires to initiate a service feature. This is accomplished in one way through the transmission of a signal or signals 126 to the serving switching node 12(3). Responsive to the signal 126, the serving switching node requests 128 over signaling link 22 service feature information from the home location register data base 20. In this example, it is assumed that the serving switching node 12(3) has not been upgraded with respect to all calling service features (and in particular the calling service feature to be initiated in response to the signal 126). The data base 20 then recognizes that the serving switching node cannot support the desired calling service feature. Accordingly, the data base 20 signals 130 a (gateway) service switching node 12(2) over signaling link 22 to pre-route the call, and then returns 132 a temporary location directory number (and associated parameters such as a service indicator) for the service switching node to the serving switching node 12(3). The call is then delivered 134 over the voice trunk 18 to the service switching node 12(2). The service switching node 12(2) then requests 136 the calling service feature information from the home location register data base 20 over signaling link 22. The data base 20 replies 138 to the service switching node 12(2) with service associated information, and the call is further handled 142 in accordance with the initiated calling service feature. The steps 136 and 138 may advantageously be skipped if the data base signal 130 sent to the (gateway) service switching node 12(2) includes the calling service feature information.

Figure 8:
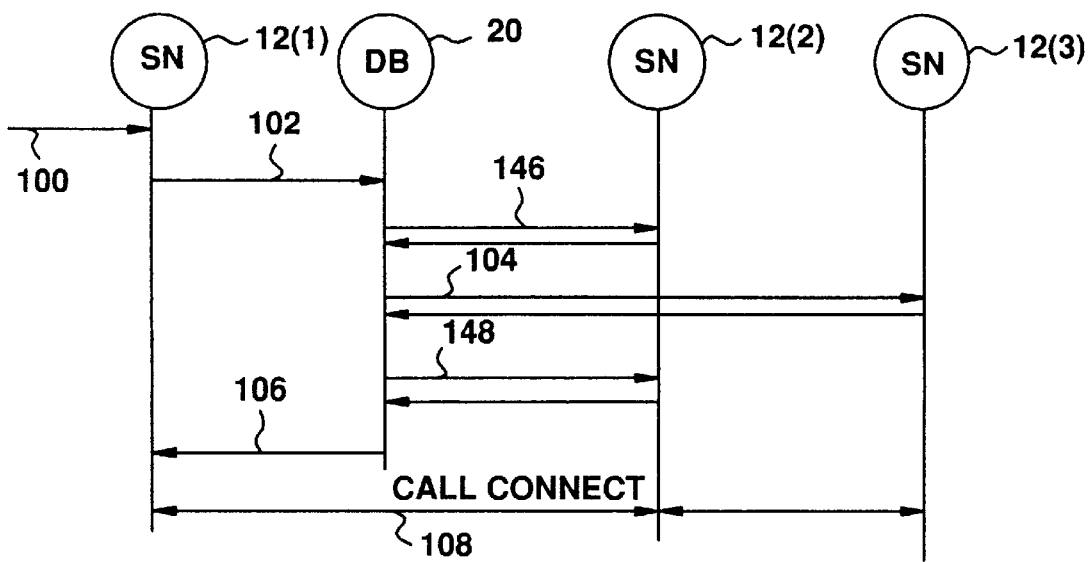
FIG. 8 is a signal flow and node operation diagram for another example call.

Reference is now made to FIG. 8 wherein there is shown a signal flow and node operation diagram for yet another example call advantageously prerouted to both the serving and service switching nodes. A call 100 originates from another cellular subscriber or the PSTN and is received at the originating switching node 12(1). Using the signaling link 22, the originating switching node 12(1) interrogates 102 the home location register data base 20 to determine both the location (i.e., serving switching node 12(3)) within the cellular network 10 of the called mobile station subscriber 14 (1), as well as the designated service switching node 12(2) for handing service requests. Responsive to this interrogation, the data base 20 signals 146 the service switching node 12(2) to preroute the call for handling thereby and reserve use of the service gateway. The data base 20 then signals 104 the serving switching node 12(3) for the called mobile station subscriber 14(1) over signaling link 22 to pre-route the call and obtain the serving temporary location directory number. The data base 20 also signals 148 the service switching node 12(2) to link the serving temporary location directory number to the service node and obtain the service temporary location directory number. Signal 146 may be incorporated into signal 148, if desired. The linked service temporary location directory number (and associated parameters) is then returned 106 to the originating switching node 12(1). The call is then delivered (through connected) 108 over the voice trunk 18 through the service switching node 12(2) to the serving switching node 12(3) for attempted completion to the called mobile station subscriber 14(1).

The foregoing are examples of scenarios for handling a call and the initiation of a calling service feature. It will, of course, be understood that the foregoing examples are not limitations on the operation of the present invention. Other scenarios and applications are possible will be apparent to one skilled in the art. Furthermore, although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A call handling method comprising the steps of:
receiving a call at a certain one of a plurality of switching nodes within a communications network;
determining whether the certain switching node has been upgraded to provide each one of a number of currently available calling service features used in connection with call handling; and
if not, redirecting and transiting the call for further handling from the certain switching node of the plurality of switching nodes to a service gateway switching node for the communications network that has been upgraded to provide each of the currently available calling service features in connection with further call handling when any one of the plurality of switching nodes in the communications network is not capable of providing a needed calling service feature.

2. A call handling method comprising the steps of:
receiving at a certain one of a plurality of switching nodes within a communications network a call dialed to a B-number;
determining whether the certain switching node has been upgraded to provide each calling service feature used in connection with call handling and that are subscripted to by a subscriber assigned to the dialed B-number; and
if not, redirecting and transiting the call for further handling from the certain switching node of the plurality of switching nodes to a service gateway switching node for the communications network that has been upgraded to provide each of the subscripted to calling service features in connection with further call handling when any one of the plurality of switching nodes in the communications network is not capable of providing a needed calling service feature.

3. The method of claim 2 wherein the step of determining comprises the steps of:
identifying from the dialed B-number the calling service features subscripted to by the subscriber; and
comparing the identified calling service features to the calling service features provided by the certain switching node.

4. The method of claim 2 wherein the step of determining comprises the step of determining whether the certain switching node has been upgraded to provide an initiated one of the subscripted to calling service features, and wherein the step of redirecting and transiting comprises the step of redirecting and transiting the call if the certain switching node has not been so upgraded.

5. A call handling method comprising the steps of:

receiving at an originating one of a plurality of switching nodes within a communications network a call dialed to a B-number;

through connecting the call from the originating switching node to a serving one of a plurality of switching nodes within the communications network associated with a telephone of a subscriber assigned to the dialed B-number;

upon initiation of a calling service feature, determining whether the serving switching node has been upgraded to provide each one of a number of currently available calling service features used in connection with call handling; and if not, redirecting and transiting the call for further handling from the serving switching node to a service gateway switching node for the communications network that has been upgraded to provide each of the currently available calling service features in connection with further call handling when any one of the plurality of switching nodes in the communications network is not capable of providing a needed calling service feature.

6. The method of claim 5 further including the step of initiating the calling service feature in response to a failure of the subscriber to answer the telephone.

7. The method of claim 5 further including the step of initiating the calling service feature by the subscriber responsive to the through connected call.

8. The method of claim 7 wherein the step of initiating includes the step of initiating following answering of the through connected call.

9. The method of claim 5 wherein the step of determining comprises the step of determining whether the originating switching node has been upgraded to provide the initiated calling service feature, and wherein the step of redirecting and transiting comprises the step of redirecting and transiting the call if the originating switching node has not been so upgraded.

10. A call handling method comprising the steps of:

receiving at an originating one of a plurality of switching nodes within a communications network a call dialed to a B-number;

through connecting the call from the originating switching node to a serving one of a plurality of switching nodes within the communications network switching node associated with a telephone of a subscriber assigned to the dialed B-number;

upon initiation of a calling service feature during call handling, determining whether the originating switching node has been upgraded to provide each calling service feature used in connection with call handling and that are subscripted to by the subscriber; and if not, redirecting and transiting the call for further handling from the serving switching node to a service gateway switching node for the communications network that has been upgraded to provide each of the subscripted to calling service features in connection with further call handling when any one of the plurality of switching nodes in the communications network is not capable of providing a needed calling service feature.

11. The method of claim 10 wherein the step of determining comprises the steps of:

identifying from the dialed B-number the calling service features subscripted to by the subscriber; and comparing the identified calling service features to the calling service features provided by the originating switching node.

12. The method of claim 10 further including the step of initiating the calling service feature in response to a failure of the subscriber to answer the telephone.

13. The method of claim 10 further including the step of initiating the calling service feature by the subscriber responsive to the through connected call.

14. The method of claim 10 wherein the step of determining comprises the step of determining whether the originating switching node has been upgraded to provide the initiated calling service feature, and wherein the step of redirecting and transiting comprises the step of redirecting and transiting the call if the originating switching node has not been so upgraded.

15. A cellular telephone communications system, comprising:

a plurality of interconnected switching nodes including a certain one of a plurality of switching nodes handling an incoming call dialed to a certain subscriber; and a service gateway switching node network connected to the plurality of interconnected switching nodes;

wherein the certain switching node is not upgraded to provide each calling service features used in connection with call handling and that are subscripted to by the certain subscriber, and the service gateway switching node is so upgraded; and means for redirecting and transiting the incoming call from the certain switching node of the plurality of interconnected switching nodes to the service gateway switching node for further call handling with access to each of the calling service features, in order to provide the calling service features when any one of the plurality of interconnected switching nodes in the communications network is not capable of providing a needed calling service feature.

16. The system of claim 15 wherein the means for transiting automatically redirects and transits the incoming call upon receipt at the not upgraded originating switching node.

17. The system of claim 15 wherein the means for redirecting and transiting redirects and transits the incoming call upon initiation of a certain calling service feature not provided by the originating switching node.

18. A cellular telephone communications system, comprising:

a plurality of interconnected switching nodes including an originating switching node with respect to an incoming call dialed to a certain subscriber, and a service switching node associated with a telephone for that subscriber; and a service gateway switching node network connected to the plurality of interconnected switching nodes;

a through connection of the incoming call from the originating switching node to the service switching node;

wherein either the originating switching node or the serving switching node is not upgraded to provide each calling service feature used in connection with call handling and that are subscripted to by the subscriber, and the service gateway switching node is so upgraded; and means for redirecting and transiting the through connected call from either the originating switching node or the serving switching node of the plurality of interconnected switching nodes to the service gateway switching node for further call handling and provision of calling service features to the subscriber, in order to provide the calling service features when any one of the plurality of interconnected switching nodes in the communications network is not capable of providing a needed calling service feature.

19. The system of claim 18 wherein the means for redirecting and transiting automatically redirects and transits the incoming call upon initiation of any calling service feature.

20. The system of claim 18 wherein the means for redirecting and transiting redirects and transits the incoming call upon initiation of a certain calling service feature not provided by the originating switching node.

* * * * *